United States Patent

[11] 3,536,034

| [72] | Inventor | Dale S. Lecrone,<br>Jackson, Michigan |
|---|---|---|
| [21] | Appl. No. | 701,338 |
| [22] | Filed | Jan. 29, 1968 |
| [45] | Patented | Oct. 27, 1970 |
| [73] | Assignee | Dawn Donut Company, Inc.<br>Jackson, Michigan<br>a corporation of Michigan. |

[54] APPARATUS FOR COATING EDIBLES
6 Claims, 7 Drawing Figs.

| [52] | U.S. Cl. | 118/16,<br>118/223 |
|---|---|---|
| [51] | Int. Cl. | A23g 3/20 |
| [50] | Field of Search | 118/17,<br>16, 13, 223 |

[56] References Cited
UNITED STATES PATENTS

| 895,856 | 8/1908 | Harton | 118/13 |
|---|---|---|---|
| 948,012 | 2/1910 | Goldsmith | 118/223X |
| 2,348,800 | 5/1944 | Fredrickson | 118/13 |
| 2,522,847 | 9/1950 | Stiles | 118/13 |

*Primary Examiner*—John P. McIntosh
*Attorney*—Beaman & Beaman

ABSTRACT: Apparatus for applying a coating layer of frosting, icing or the like to edibles comprising supporting and transporting the edible item to be coated over a plurality of rollers which are in contact with a liquid form of the icing to be applied to the item. A plurality of coating rollers are used for the sole support of the edible items during coating and sequential contact of the items with the rollers produces a uniform and consistent icing. The rollers are used in conjunction with means for turning the coated items over, and the coating rollers are mounted upon a head which may be inserted into or removed from a conveyer system.

Patented Oct. 27, 1970 3,536,034

INVENTOR
DALE S. LECRONE

BY Beaman & Beaman

ATTORNEYS

Patented Oct. 27, 1970

INVENTOR
DALE S. LECRONE

BY Beaman & Beaman

ATTORNEYS

Patented Oct. 27, 1970
3,536,034
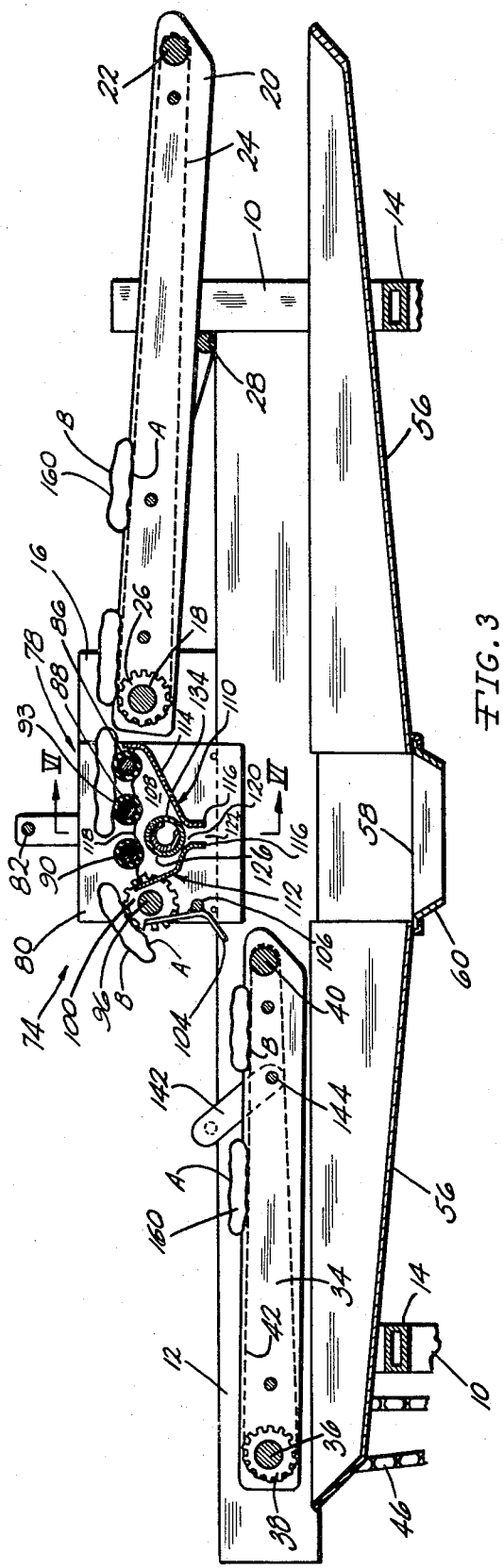
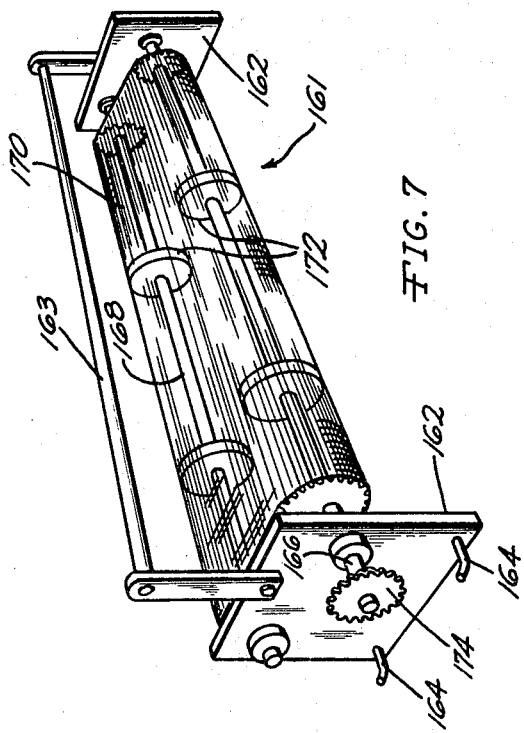
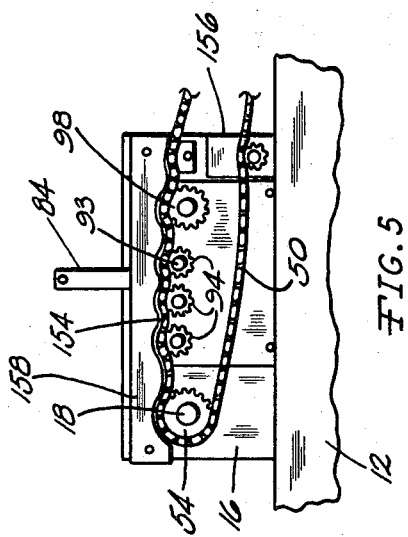
INVENTOR
DALE S. LECRONE
BY Beaman+Beaman
ATTORNEYS

3,536,034

APPARATUS FOR COATING EDIBLES

BACKGROUND OF THE INVENTION

The invention pertains to the field of coating edible items, such as baked goods, by direct contact of the item with a coated roller wherein the coating is transferred from the roller to the item.

In the processing of foods, such as baked goods, it is often desirable to coat one side of the product with a frosting, icing or similar coating. For instance, a sugar-coating is often applied to one side of pastry items. Also, it is common to coat baked goods with chocolate, or other type of flavored icing on one side only.

In the application of a layer of frosting, icing or the like to edible items, such as baked goods, it is desired that an even and uniform coating be applied to the product, yet the thickness must be regulated, and from an appearance standpoint the coating should not bear the marks of the handling, coating, or conveying apparatus. In small quantities, the application of a frosting or icing to baked goods is done manually. However, in large-scale operations it has been the practice to use several types of equipment for applying the desired coating layer. For instance, spraying techniques are often used with sugar-type coatings and glazings, however, spraying results in considerable wastage of the coating material and control of the location of the coating upon the product is not precise.

It is known to employ rollers to apply the coating material to the product, as shown in U.S. Pat. No. 2,380,806. With this type of apparatus the product is supported upon an open conveyer, and the roller coats the bottom surface of the product through the conveyer. This sort of arrangement is objectionable due to the presence of the conveyer which leaves undesirable marks upon the product. In the evaluating and testing of roller applications for coating purposes it has been found that acceptable results are only obtained when a plurality of coating rollers are employed, and the prior art has not appeared to previously appreciate the advantages which can be derived from the concept set forth in the invention.

SUMMARY OF THE INVENTION

In the inventive concept, apparatus is employed utilizing a supply conveyer, which transports the product to be coated to a coating station formed in accord with the invention. A second conveyer transports the product from the coating station, and the entire apparatus of the invention may be incorporated into a complete conveyer system and may be rendered active or inactive, depending upon the type of product being conveyed. The coating station consists of a removable head upon which a plurality of coating rollers are mounted. Each of the rollers is power-driven to rotate in a common direction, and the coating rollers themselves constitute a portion of the entire conveying system in that the products are supported upon the coating rollers, and are conveyed thereby simultaneously during the coating procedure.

The coating station also includes "turnover" means disposed adjacent the coating rollers for receiving and removing the coated product from the coating rollers and conveying the coated product to the conveyer which carries the product away from the coating station. The "turnover" roller is of such configuration as to not adversely mark or deface the coated product surface, and conveys the product to the associated conveyer in such a manner that the product is turned over and then rests upon the uncoated surface.

A reservoir for the coating material is mounted upon the coating head and is so constructed that the material within the reservoir engages the lower portions of the coating rollers. Thus, as the coating rollers rotate they will be adequately coated by the coating material to transfer the coating material to the bottom surface of the product passing thereover. The reservoir includes a throat portion which is selectively restricted by a distributor conduit or manifold. The conduit is removably associated with the coating head whereby removal from the reservoir permits the reservoir to quickly drain, and enables the coating head to be removed from the conveyer system for easy cleaning. The ease with which the coating head may be removed from the conveyer system is a feature of the invention, and the coating head may be easily replaced with a substitute conveyer head when products are used which are not to be coated.

Unique drive means are defined upon the coating head whereby a driving connection between the coating rollers and the power means of the apparatus is automatically accomplished upon insertion of the coating head into position.

The coating rollers employed are spaced apart from each other, and are so arranged that most products will be solely supported by the coating rollers during the major portion of the coating operation, and as only the weight of the product maintains engagement of the product with the coating rollers, the product is not crushed or otherwise deformed, as is often the case with coating apparatus of other constructions.

BRIEF DESCRIPTION OF THE DRAWING

The advantages set forth above will be appreciated from the description of a preferred embodiment of the invention as set forth below, and accompanied by the drawings wherein:

FIG. 3 is an enlarged detail elevational sectional view as taken through III–III of FIG. 2, the "unloading" conveyer being shown in the lower position as used during the coating of products;

FIG. 5 is a detail elevational view of the roller's drive mechanism as taken along section V–V of FIG. 2;

FIG. 7 is a perspective view of a conveying head which may be substituted for the coating head when it is not desired to coat products being conveyed by the apparatus illustrated in FIG. 1.

DESCRIPTION OF THE PREFERRED EMBODIMENT

Figure 1:
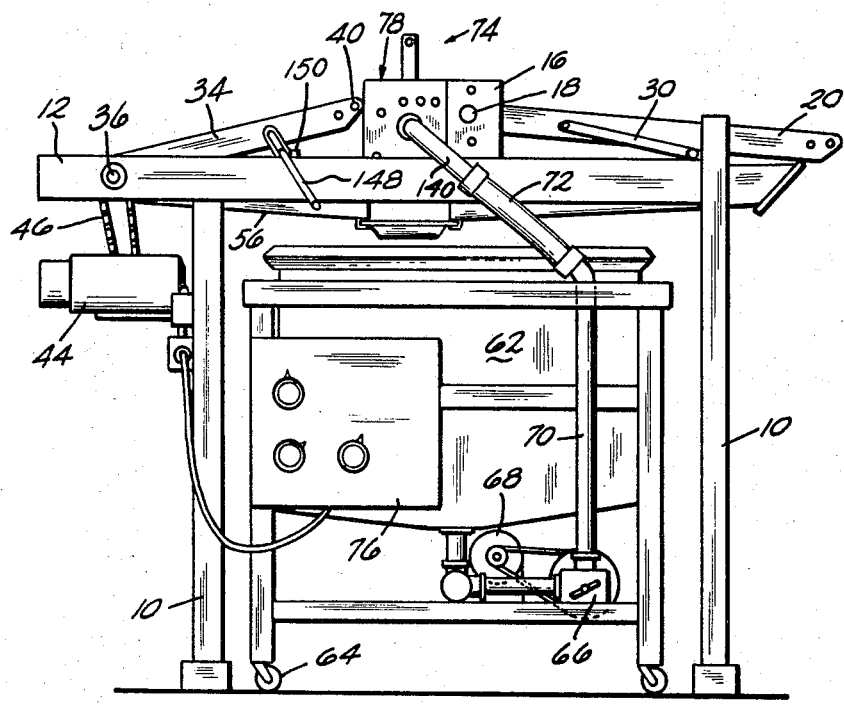
FIG. 1 is a side elevational view of coating apparatus in accord with the invention, the "unloading" conveyer being shown in the raised position.

The complete apparatus in which the inventive concept may be utilized is best illustrated in FIG. 1. The apparatus of FIG. 1 is such as to be included in a complete conveyer system such as commonly utilized with high production baking equipment. With such equipment, conveyers connect ovens, packaging equipment and the like wherein the system is highly automated and proceeds with little human attention.

The apparatus shown in FIG. 1 includes a frame consisting of four vertical column members 10. Horizontally disposed frame members 12 are mounted upon the column members and the framework may be of a welded construction. Cross members 14, FIG. 3, interconnect the column members transverse to the longitudinal direction of the frame members 12.

Figure 2:
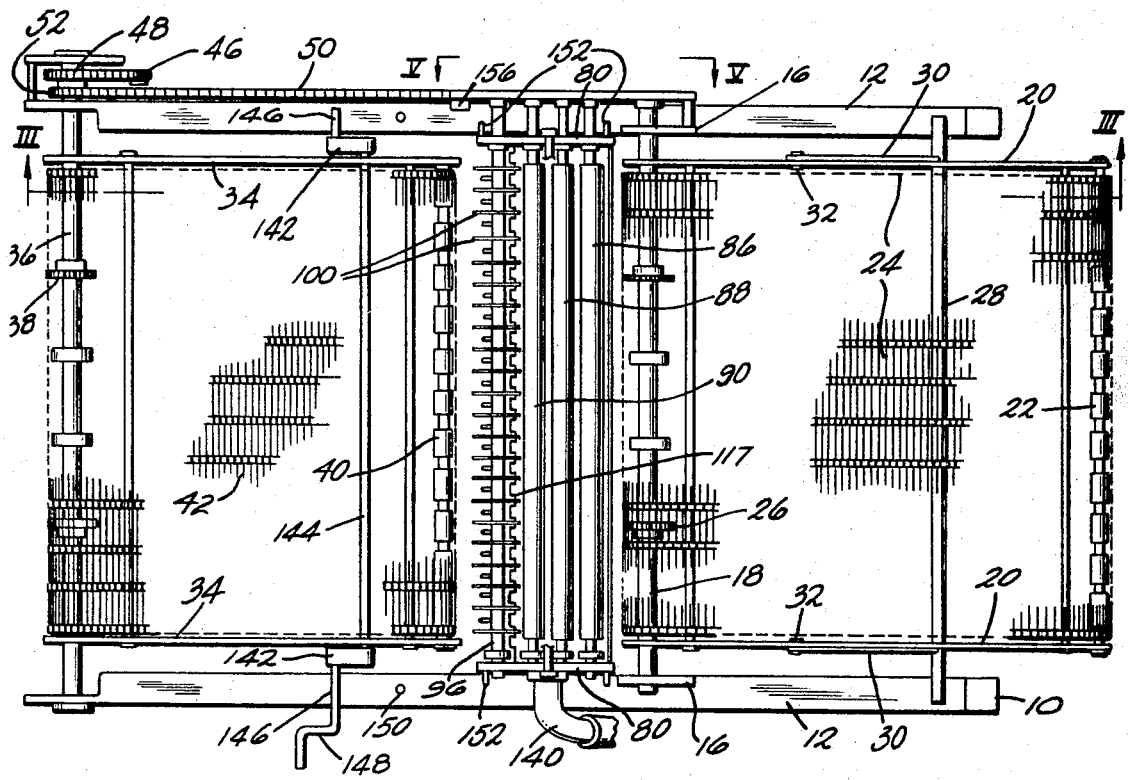
FIG. 2 is a plan elevational view of the coating apparatus in accord with the invention as taken from the top of FIG. 1 with the "unloading" conveyer in the coating position.

A conveyer support block 16 is mounted upon each of the horizontal members 12, extending thereabove, and a rotatable conveyer drive shaft 18 is mounted in these blocks as will be apparent from FIGS. 2 and 3. A pair of spaced parallel conveyer support arms 20 are pivotally mounted upon the shaft 18 and extend outwardly from the blocks 16 to the right, FIG. 1. At the outer end of the arms 20 a conveyer idler roller 22 is rotatably mounted, and an open wire conveyer belt 24 is mounted upon the shaft 18 and the idler roller 22. The shaft 18 includes notched drive wheels 26 which mesh with the wires of the conveyer belt 24 and thereby drive the conveyer.

A transversely extending bar 28 is located under the arms 20 and is pivoted to the arms by means of levers 30 and pivot pins 32. As the outer ends of the bar 28 transversely extend beyond the arms 20 to rest upon the frame members 12 the bar will hold the conveyer arms in the operative position shown in the drawings, yet the outer idler roller end of the conveyer may be swung upwardly around the axis of shaft 18 to permit access to the crumb pan below the conveyer, and swinging of the bar 28 into engagement with the blocks 16 will maintain the conveyer arms in the elevated inoperative position.

A pair of conveyer arms 34 are pivotally mounted to the left portion of the frame members 12, FIG. 1, by a conveyer drive shaft 36 having conveyer drive wheels 38 mounted thereon. The arms 34 extend toward the central portion of the apparatus and support a rotatable conveyer idler roller 40 adjacent the coating station. An open wire conveyer belt 42 is mounted upon the rollers 38 and idler roller 40.

The conveyer drive means preferably includes an electric motor 44 in driving connection with a variable-speed transmission having an output through chain 46. The chain 46 meshes with a sprocket 48 mounted upon conveyer shaft 36. A second chain 50 mounted upon a sprocket 52 on shaft 36 meshes with the sprocket 54 formed upon the supply conveyer shaft 18, FIGS. 2 and 5. In this manner the conveyer belts 24 and 42 are power-driven by the electric motor 44.

As best illustrated in FIG. 3, pans 56 are mounted upon the framework for collecting crumbs which fall or drip from the products passing over the conveyers. The pans converge downwardly in a central region wherein an opening 58 is defined. A deflector member 60 is preferably removably affixed to a guideway defined on the underside of the pans 56 at the opening 58, and the member 60 is centrally open to provide access between the coating station and the coating material supply source through opening 58, as will be later described.

The coating material is supplied to the coating station from the apparatus illustrated in FIG. 1. An open top reservoir 62 is mounted upon a framework supported upon wheels 64. The reservoir 62 may be of conventional construction employing electric heating elements wherein the coating material, such as chocolate, a sugar composition, or the like, may be heated to a liquid consistency and drained from the reservoir to a pump 66 power-driven by electric motor 68. The pump 66 supplies the heated coating material through conduits 70 and flexible conduit 72 to the coating station, generally indicated at 74. The necessary controls and electrical equipment are placed within housing 76 affixed to the reservoir framework.

Figure 4:
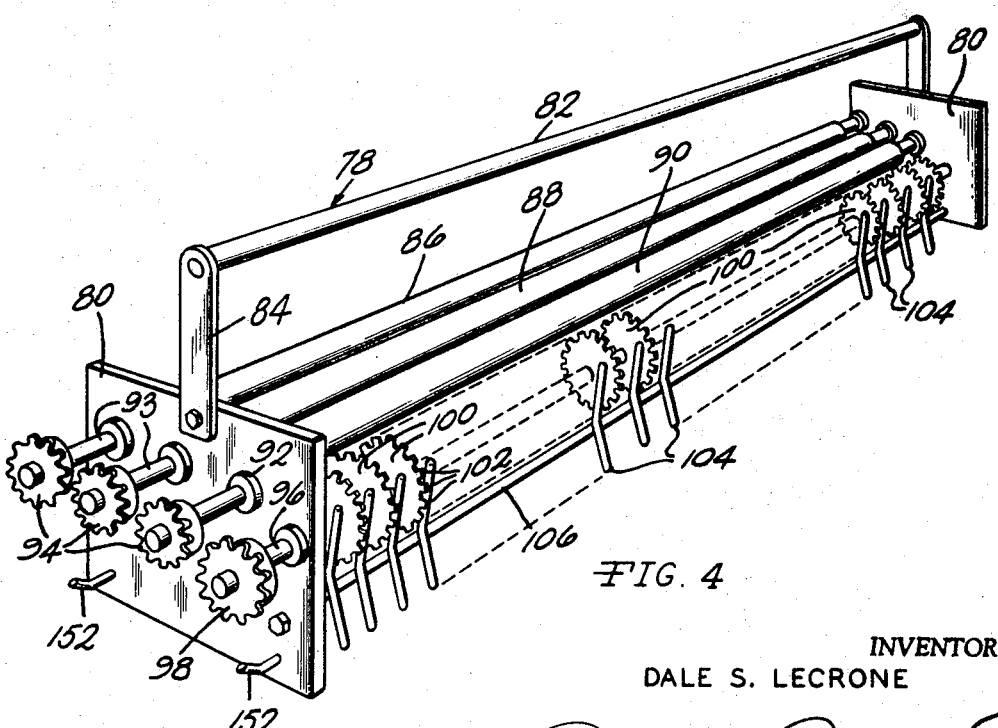
FIG. 4 is an elevational front and side perspective view of the coating head in accord with the invention.

The coating station 74 consists of a head 78, FIG. 4, having a pair of spaced plate elements 80 maintained in spaced relationship. The plates 80 are interconnected by a handle member 82 affixed to brackets 84 attached to the plate elements. In the preferred embodiment three coating rollers 86, 88 and 90 are mounted upon the plate elements 80 and interposed there between. The rollers are mounted upon bearings 92 and each include internal shafts 93 which extend beyond the plate elements whereby a chain sprocket 94 may be affixed to the end of each roller shaft. The coating rollers 86, 88 and 90 are illustrated as being covered on their peripheries with a rubber material, and these rollers may be thus formed, or can be steel having no covering. The rollers 86, 88 and 90 are preferably of substantially similar diameter and are evenly spaced from each other and are located in a coplanar manner. Thus, the upper surfaces of the coating rollers define a conveying surface for the product, FIG. 3, and the spacing between the rollers is such that the product will be simultaneously supported by several of the rollers and will not tend to fall therebetween.

Means are provided upon the coating head 78 to remove the coated product from the coating rollers, and "turn over" the product as it leaves the coating head. In the illustrated embodiment such means take the form of a shaft 96 rotatably mounted on bearings between the elements 80 in a parallel relationship to the coating rollers. A chain sprocket 98 is affixed to the end of the shaft 96 extending from the same element 80 as the ends of roller shafts 93. A plurality of circular discs 100 are affixed to the shaft 96 throughout its length in axial-spaced relationship to each other. The discs 100 are of a narrow axial configuration and the peripheries are provided with a plurality of projections 102 extending in a radial direction. The discs 100 are spaced close enough together whereby several of the discs will simultaneously engage the products being coated and being transferred to the discs from the roller 90, and the support of the products occurs solely at the outer ends of the projections 102. Stripping means in the form of fingers 104 affixed to the rod 106 interposed between plates 80 are used to strip the product from the discs 100 should the product tend to adhere thereto. Fingers 104 are interposed between adjacent discs throughout the length of the shaft 96. As will be noted in FIG. 3, the diameter of the discs 100 is greater than that of the coating rollers 86, 88 and 90, and the shaft 96 is set "lower" than the coating rollers. However, the relationship is such that the upper portion of the discs 100 is substantially in alignment with the uppermost portions of the coating rollers.

The coating material is placed upon the coating rollers by means of a reservoir located immediately below the coating rollers. The reservoir 108 is defined by sheet metal wall members 110 and 112, FIG. 3, interposed between the plate elements 80. The wall members each include an upper portion 114 and a lower portion 116. The upper portion 114 of the wall member 112 is notched at 117 to provide clearance for the discs 100, and the wall members are located such that the level of the coating liquid therein engages the lower portion of the coating rollers 86, 88 and 90, as shown in FIG. 3 where the coating liquid level is represented at 118. The maximum width between the wall member portions 114 is greater than the spacing between rollers 86 and 90 and the upper portions of the wall members, converge in the lower direction to define a throat 120 adjacent the reservoir draining channel 122 defined by the wall lower portions 116.

Figure 6:
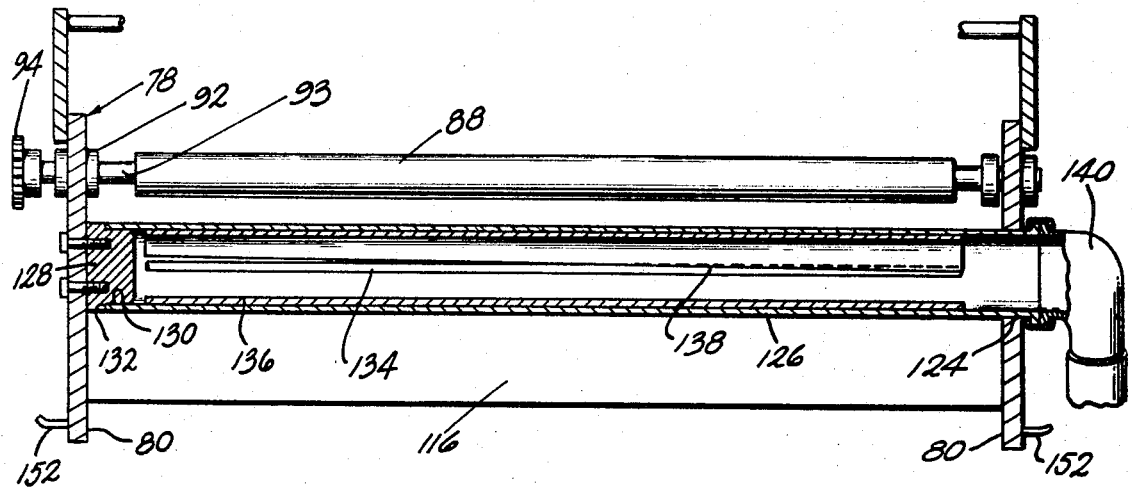
FIG. 6 is an elevational sectional view taken through the coating head as taken along section VI–VI of FIG. 3.

The right coating headplate element 80, FIG. 6, is provided with a circular hole 124 adapted to closely receive a cylindrical distributor or manifold 126. As shown in FIG. 6 a distributor support plug 128 is defined upon the left plate element 80, FIG. 6, having a circular surface 130 and a shoulder 132 wherein the open end of the distributor 126 may be closely fitted thereupon and sealed thereby. The diameter of the distributor 126 is such as to associate with the throat 120 of the reservoir 108 defined by the walls 110 and 112 and restrict this throat to the flow of coating material through the channel 122. The distributor 126 is formed with a longitudinally extending slot 134, FIG. 6, and an annular gate 136 may be rotatably supported within the distributor having an inclined edge 138 which may be used to adjust the effective circumferential opening of the slot 134. In this manner, rotation of the gate 136 to a selected position will vary the amount of flow of coating material through the slot 134 along its length. The distributor 126 is provided with an elbow 140 which communicates with the flexible conduit 72 attached to the pump output conduit 70.

The conveyer arms 34 and belt 42 are positionable between two operative positions. The noncoating or "up" position is that shown in FIG. 1, while the coating position is that shown in FIG. 3. Positioning of the conveyer belt 42 between these two positions is accomplished by means of crank levers 142 pivotally mounted to the arms 34 by a pivot rod 144. The levers 142 include portions 146 which rest upon the adjacent frame member 12 and the portion 146 disposed toward the viewer in FIG. 1 is provided with a crank handle extension 148 for pivoting crank levers 142. Stops 150 are mounted upon the frame members 12 for contact with the portions 146 when the crank levers 142 are swung to the "up" position shown in FIG. 1. When the crank levers 142 are swung to the position shown in FIG. 3 the arms 34 and belt 42 are lowered with respect to the coating station 74, and the idler roller 40 is located below the shaft 96.

When the conveyer belt 42 is in the "up" position shown in FIG. 1 the idler roller 40 is in substantial horizontal alignment with the coating rollers 86, 88 and 90, and products will be received from the coating station directly upon the conveyer belt 42 without turning the products over. This position is normally only used when the coating station is not being employed for coating purposes. When coating is being produced the crank levers 142 are swung to the position which lowers the conveyer belt 42, as in FIG. 3, whereby products passing over the discs 100 turn over before being received upon the conveyer belt.

The distance separating the plate elements 80 of the head 78 is less than the distance separating the frame members 12, and pins 152 are mounted upon each of the plate elements extending outwardly therefrom whereby the head may be maintained in position upon the framework by resting upon the pins 152, FIG. 2. When the head 78 is located in the proper position, which is adjacent blocks 16, the coating head will be interposed between the shaft 18 of the conveyer belt 24 and the idler roller shaft 40 of the conveyer belt 42, FIG. 3. The coating head is placed in this position by inserting the sprockets 94 and 98 under the portion 154 of the chain 50, FIG. 5. Thereupon, upon setting the pins 152 mounted in the elements 80 upon the associated framework 12, the sprockets 94 and 98 engage the chain 50. A chain guide support 156 is mounted upon the rear frame member 12, and a contoured chain-positioning guide 158 is interposed between the block 16, and the support 156 overlying chain portion 154. As apparent in FIG. 5, the guide 158 maintains engagement of the sprockets 94 and sprocket 98 with the underside of the chain portion 154, to establish a driving connection which will rotate the rollers 86, 88 and 90, and the discs 100 in a common direction.

In operation, the coating head 78 is positioned upon the apparatus as shown in FIGS. 1 through 3, resting upon pins 152, and the conveyer belt 42 is positioned at its lowermost position, FIG. 3. The distributor 126 is inserted through the circular hole 124 to assume the relationship shown in FIGS. 3 and 6, and the gate 136 is positioned relative to the slot 134 which will provide a uniform flow from the slot to the loading head reservoir 108 for the consistency of the coating material being pumped.

Energization of the electric motor 44 will drive chain 46 which causes conveyer shaft 36 to rotate. Likewise, the conveyer shaft 18 will be rotated through the chain 50, and as the location of the coating head upon the frame will place the sprockets 94 and 98 in engagement with the chain 50, as in FIG. 5, the coating rollers 86, 88 and 90 and the discs 100 will be rotating in the counterclockwise direction, FIG. 3, and the upper portion of the conveyer belts 24 and 42 will be moving toward shaft 36.

The pump motor 68 is energized to actuate pump 66 and supply the coating material to the reservoir 108 through the distributor 126. As the coating material is pumped to the distributor it will be expelled through the slot 134 throughout the length of the distributor and cause the reservoir to fill to the level 118 shown in FIG. 3 where the coating rollers will be in engagement with the coating material. The reservoir 108 will fill because the distributor 126 closes the throat 120 upon being inserted into the head 78. Thus, as the rollers 86, 88 and 90 rotate, their surfaces will be coated by the coating material, and the thickness of the coating material upon the rollers will be determined by the nature and viscosity of the coating material and the spacing between the rollers. The output of the pump 66 is regulated such that the amount of coating material being supplied to the reservoir 108 is substantially equal to that required to coat the products, however, if more coating or glazing material is supplied to reservoir 108 than is consumed, the material will flow over the upper edge of wall 112, and it will be appreciated that any overflow of reservoir 108, or flow through notches 117 will fall through deflector 60 back into reservoir 62.

The products to be coated, generally indicated at 160, may be baked goods, such as pastry, and are conveyed to the right end of the conveyer belt 24, FIGS. 2 and 3, by other conveying means of the system, not shown. The products 160 each include a side A, and an opposite side B. As illustrated, the products rest upon the conveyer belt 24 upon the side A, FIG. 3.

The products 160 are conveyed to the coating station 74 by the conveyer belt 24 and thus the product side A will sequentially engage each of the coating rollers 86, 88 and 90, FIG. 3. The roller 86, FIG. 3, will apply the initial layer of the coating material to the product side A, and usually, the thickness of the coating layer applied by this roller will be greater than those applied by the subsequent coating rollers. As the product passes over the coating rollers each of the rollers will apply the liquid coating to the product side A, and as the force maintaining the product in engagement with the coating rollers results only from the weight of the product upon the rollers no crushing or damage to the product takes place during this coating procedure. As a uniform layer of coating material is applied to the product by each roller an attractive and uniform coating or glazing of side A will occur, and the thickness of the coating layer is such as to permit the coating to be received in most cracks and crevices of the product.

After the product passes over the roller 90, FIG. 3, the projections 102 defined upon the discs 100 will receive the product and engage the coated side A and pick off the product from the roller 90. However, in that only the ends of the projections 102 engage the coating, the coating is not smeared or otherwise significantly disturbed, and the disc projections are able to remove the product from the adjacent coating roller in such a manner as to maintain the uniform coating which has been produced at the coating rollers.

As the product passes over the discs 100 the foremost end of the product extends downwardly toward the conveyer belt 42, and due to the friction between the products and the projections 102, the product "flips over" upon its leaving the disc projections. should the product tend to "stick" to the discs 100 the stripping fingers 104 will aid in removing the product from the disc and flipping the product over. As the product turns over upon leaving the discs 100 the coated side A will now be facing upwardly, and the product will rest upon the conveyer belt 42 upon its uncoated side B. The fact that the product now rests upon the coated side B prevents the conveyer apparatus from engaging the coated side A, and thereby marring the coated surface in any manner. The products are conveyed by the conveyer belt 42 away from the coating station 74 to other conveying apparatus disposed adjacent the conveyer shaft 36, not shown.

As the pump 66 continues to supply coating material to the reservoir 108, a uniform coating takes place on all products passing over the coating rollers 86, 88 and 90, and the entire procedure takes place automatically requiring only periodic supervision.

When it is desired to clean the apparatus, or change the type of coating material being used, the distributor 126 is pulled from the coating head 78 through the hole 124. This procedure fully opens the throat 120 and permits the coating liquid within the head reservoir 108 to flow to the vat reservoir 62. The operator then grasps the loading head handle 82, and lifts the head end in which hole 124 exists. This motion is accompanied by a pivoting of the head, and the pins 152 below the sprockets 94, FIG. 6, may be pulled from the supporting frame member 12 which lowers all of the chain sprockets from engaging with the chain 50, permitting the entire head to be lifted clear of the apparatus and transported to a cleaning area. If another coating liquid is to be immediately used with the apparatus a new coating head, or the same coating head after being cleaned, is reinserted in place upon the frame members 12 in a motion reverse to that described above wherein the sprockets 94 and 98 will engage the chain 50, and a new or refilled reservoir 62 with associated pump and equipment may be immediately rolled under the frame which contains the desired coating material. The distributor 126 is then inserted through the hole 124, and upon energization of the conveyer motor 44, and the pump motor 68, the apparatus is again ready to coat products.

If a large number of products are to be conveyed over the entire conveyer system, including the coating apparatus, which do not require a coating, it is possible to substitute the auxilary conveyer head 161 shown in FIG. 7, for the coating head 78 previously described. The conveyer head shown in FIG. 7 includes spaced plate elements 162 corresponding to plates 80 interconnected by handle 163, and uses pins 164 for supporting the head upon the frame members 12. A conveyer drive shaft 166 is rotatably interposed between the elements 162, and an idler shaft 168 is likewise rotatably mounted upon the elements 162, and an idler shaft 168 is likewise rotatably mounted upon the elements 162 at a spaced, parallel location relative to the shaft 166. An open wire conveyer belt 170 is disposed over the belt rollers 172 mounted upon the drive shaft and the idler shaft, and this conveyer belt will directly receive products 160 passing from the conveyer belt 24 when the auxiliary conveyer head 161 is positioned upon the frame members 12 and the sprocket 174 fixed to the drive shaft 166 is located below the chain 50 and meshed therewith, to drive the shaft 166. When using the auxiliary conveyer head 161 of FIG. 7 the conveyer arms 34 are held in the upper position shown in FIG. 1, by rotating the crank levers 142 to the position shown. In this position the idler roller end of the conveyer belt 42 is adapted to directly receive the products passing from the conveyer belt 170, without turning the products over. When it is desired to again render the coating apparatus operative, the auxiliary conveyer head 161 is removed from the apparatus and the coating head 78 previously described is reinserted in place.

Of course, if only a short run of uncoated products will be passing over the apparatus of the invention the coating head 78 may be left in place on the frame members 12 and the rollers 86, 88 and 90 and discs 100 used to convey the products from belt 24 to belt 42 with the apparatus in the position of FIG. 1. Under these circumstances no coating material is being pumped to the coating head, and reservoir 62 could be removed from under the frame, if desired.

It will be appreciated that the aforedescribed apparatus permits edible products, such as baked goods, to be readily coated without harming the product, and yet provides a consistent and attractive coating or icing. The apparatus is readily cleaned whereby the required sanitary conditions can be maintained. The apparatus is also relatively inexpensive, efficient in the usage of coating material, and adaptable for use with a wide variety of coating materials.

It is appreciated that various modifications to the invention may be apparent to those skilled in the art without departing from the spirit and scope thereof, and it is intended that the invention be defined only by the scope of the following claims:

I claim:

1. Apparatus for applying a coating upon edible items comprising, in combination, a coating station, a first conveyor transporting items to be coated to said coating station, a second conveyor transporting coated items from said coating station, said coating station comprising a head removable and insertable between said conveyors, said head including a pair of spaced support elements, a plurality of rotatable coating rollers rotatably mounted upon and interposed between said elements in side-by-side and substantially parallel relationship, driven means mounted upon each of said rollers, power-driven drive means disposed adjacent said coating station engaging with said roller-mounted driven means upon insertion of said head into operative position between said conveyors, a liquid coating material reservoir disposed below said rollers, said rollers including lower portions extending into said reservoir for contact with the coating material therein, said reservoir being supported upon and interposed between said elements, said first conveyor adapted to convey items to be coated onto said rollers, said second conveyor adjacent said coating station being disposed below said rollers, and coated item turn over means disposed adjacent said coating station receiving coated items therefrom causing said items to turn over prior to being received by said second conveyor, said coated item turnover means being supported upon and interposed between said elements.

2. A removable head for applying a coating upon edible items comprising, in combination, a pair of spaced supporting elements, mounting means defined on said elements for supporting said elements upon a supporting frame, a plurality of substantially parallel coating rollers rotatably mounted upon and interposed between said elements, driven means mounted upon each of said rollers, and a reservoir for liquid coating material mounted between said elements below said rollers, the portion of said rollers disposed toward said reservoir being located within the confines of said reservoir as to engage coating liquid contained therein, said reservoir being defined by a pair of wall members.

3. A head for applying a coating upon edible items as in claim 2 wherein a shaft is rotatably mounted upon and interposed between said elements substantially parallel to said rollers and located adjacent the last roller in the direction of operative roller rotation, drive means mounted on said shaft, a plurality of discs mounted upon said shaft axially spaced thereon relative to each other, said discs having an upper portion in substantial planar alignment with the upper portion of said rollers whereby said discs receive coated items from the adjacent roller.

4. Apparatus for applying a coating upon edible items comprising, in combination, a frame, a coating station removably mounted on said frame, a first conveyor transporting items to be coated to said coating station mounted on said frame, a second conveyor mounted on said frame transporting coated items from said coating station, said second conveyor being disposed below said coating station, said coating station including a plurality of rotatable coating rollers mounted in side-by-side relationship upon common support means, said support means being supported on said frame, drive means rotating said rollers in a common direction, a shaft mounted on said common support means substantially parallel to said coating rollers, said drive means rotating said shaft, a plurality of discs mounted upon said shaft axially spaced thereon relative to each other, a liquid coating material reservoir mounted on said common support means and disposed below said rollers, said rollers including lower portions extending into said reservoir for contact with the coating material therein, said first conveyor adapted to convey items to be coated onto said rollers, and said second conveyor adjacent said coating station receiving coated items from said discs, said discs receiving the coated item from the adjacent coating roller and imparting a rotating motion to the items such that said items turn over upon dropping from said discs to said second conveyor.

5. Apparatus for applying a coating upon edible items as in claim 4 wherein said discs include a plurality of radial projections defined upon the peripheries of said discs, said projections having ends which engage the coated surface of the item received from the adjacent coating roller.

6. Apparatus for applying a coating upon edible items comprising, in combination, a coating station, a first conveyor transporting items to be coated to said coating station, a second conveyor transporting coated items from said coating station, said coating station comprising a head removable and insertable between said conveyors, said head including a pair of spaced support elements, a plurality of rotatable coating rollers rotatably mounted upon and interposed between said elements in side-by-side and substantially parallel relationship, driven means mounted upon each of said rollers, power-driven drive means supported adjacent said coating station engaging with said roller-mounted driven means upon insertion of said head into operative position between said conveyors, a liquid coating material reservoir disposed below said rollers, said rollers including lower portions extending into said reservoir for contact with the coating material therein, said reservoir being supported upon and interposed between said elements, said first conveyor adapted to convey items to be coated onto said rollers, and said second conveyor adjacent said coating station being disposed below said rollers and receiving coated items therefrom.

75